(12) United States Patent  
Sellberg et al.

(10) Patent No.: US 7,614,834 B2  
(45) Date of Patent: Nov. 10, 2009

(54) TIE-DOWN ANCHOR FOR FREIGHT

(75) Inventors: Ronald P. Sellberg, Naperville, IL (US); Richard W. Dawson, Naperville, IL (US)

(73) Assignee: TTX Company, Chicago, IL (US)

(*) Notice: Subject to any disclaimer, the term of this patent is extended or adjusted under 35 U.S.C. 154(b) by 0 days.

(21) Appl. No.: 11/228,067

(22) Filed: Sep. 16, 2005

(65) Prior Publication Data

US 2006/0062649 A1     Mar. 23, 2006

Related U.S. Application Data

(60) Provisional application No. 60/610,917, filed on Sep. 17, 2004.

(51) Int. Cl.  
*B60P 7/06* (2006.01)

(52) U.S. Cl. ..................................... 410/121

(58) Field of Classification Search .............. 410/121, 410/101, 106, 122  
See application file for complete search history.

(56) References Cited

U.S. PATENT DOCUMENTS

| | | | |
|---|---|---|---|
| 3,799,070 A * | 3/1974 | Munson | 410/149 |
| 3,843,081 A | 10/1974 | Meier et al. | 248/223 |
| 6,089,804 A * | 7/2000 | Bartelt | 410/140 |
| 7,004,080 B2 * | 2/2006 | Creighton et al. | 105/404 |
| 7,258,516 B1 * | 8/2007 | Collins et al. | 410/99 |
| 2004/0253073 A1 * | 12/2004 | Gohata | 410/100 |

FOREIGN PATENT DOCUMENTS

| | | |
|---|---|---|
| CA | 977617 | 11/1975 |
| CA | A2 162040 | 11/1975 |

* cited by examiner

*Primary Examiner*—H Gutman  
(74) *Attorney, Agent, or Firm*—Brinks Hofer Gilson & Lione

(57) ABSTRACT

A floor tie-down anchor for securing freight during transport is provided. The tie-down anchor is an L-shaped bracket having a pair of legs that form an angle relative to each other, and one of the legs has at least one aperture defined therethrough. A system and method for securing freight to a transport vehicle are also provided. The system includes a first tie-down anchor and a second tie-down anchor attached to the floor of a transport vehicle, and each of the tie-down anchors has at least one aperture defined therethrough. The system further including a retaining strap having a connecting mechanism attached to each end of the strap, and the apertures of the tie-down anchors are adapted to receive the connecting mechanisms of the strap. The method of securing freight to a transport vehicle includes providing a floor. First and second tie-down anchors are attached to the floor, and each of the tie-down anchors has at least two apertures of different shapes defined therethrough. The method also includes positioning a strap across a portion of the freight and securing the opposing ends of the strap to the tie-down anchors, and further includes adjusting the strap to secure the freight to the transport vehicle.

12 Claims, 6 Drawing Sheets

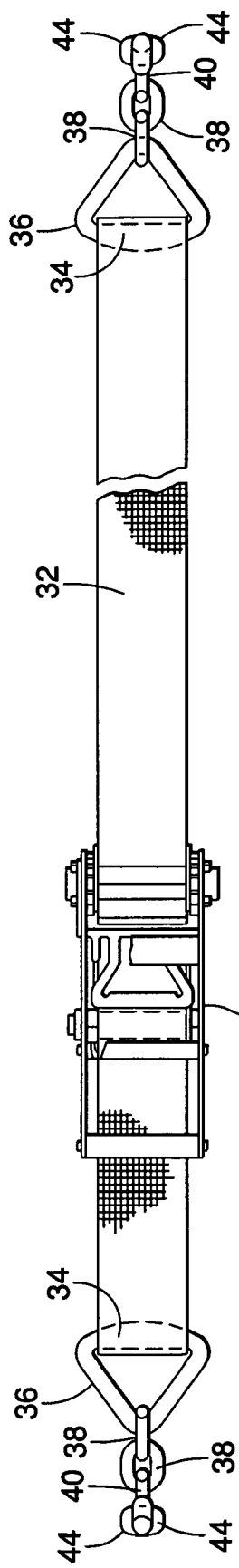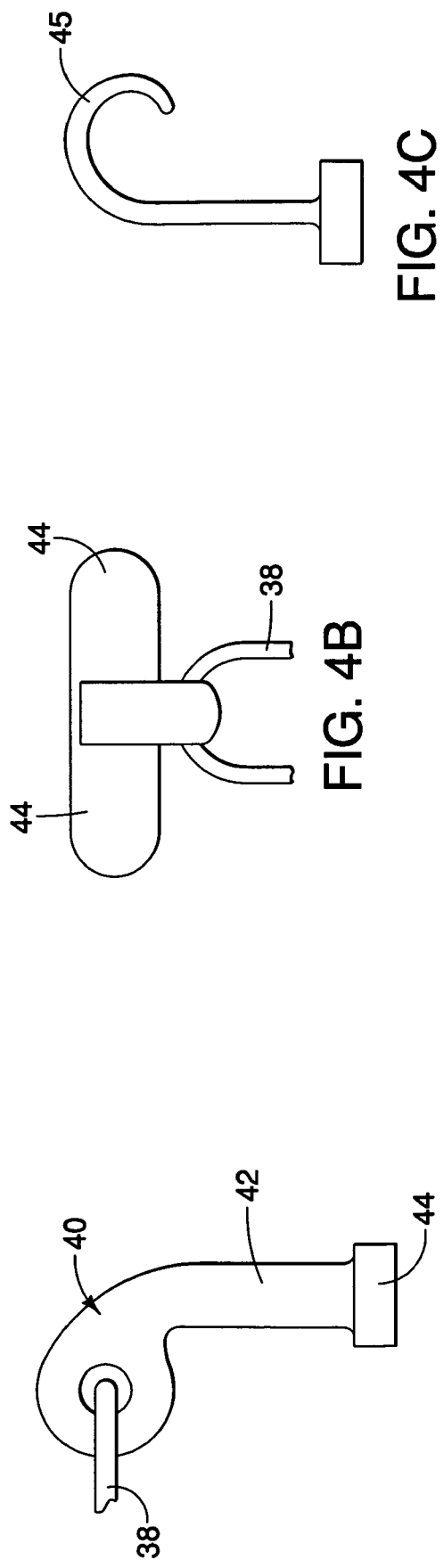

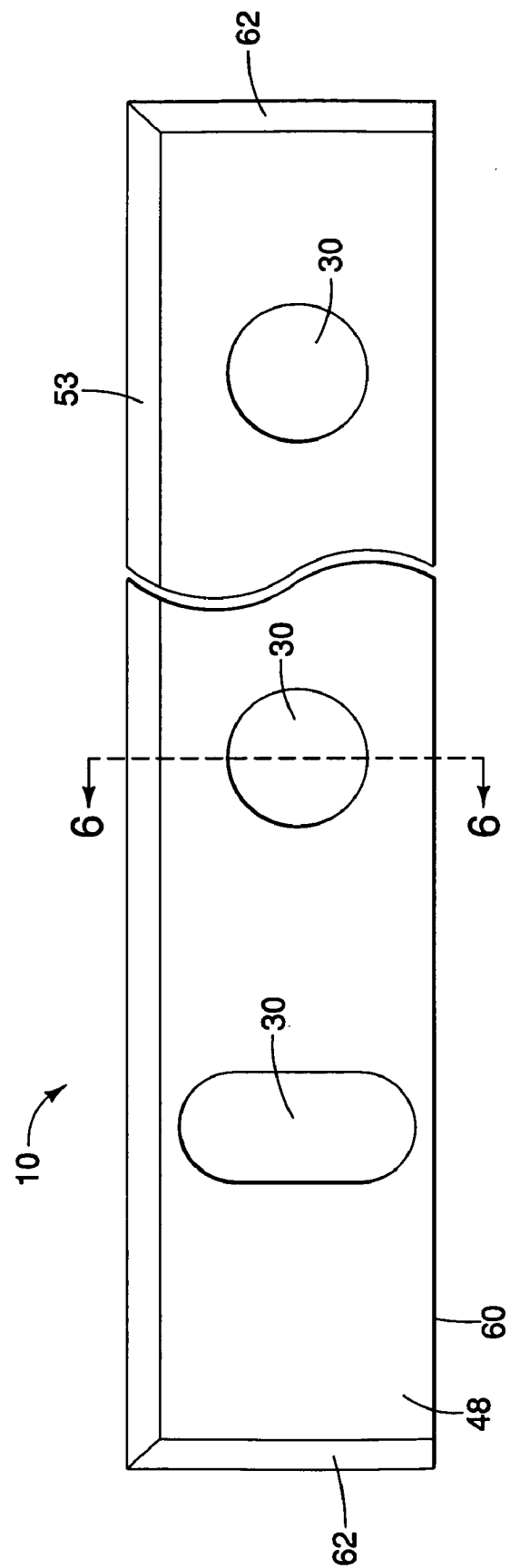
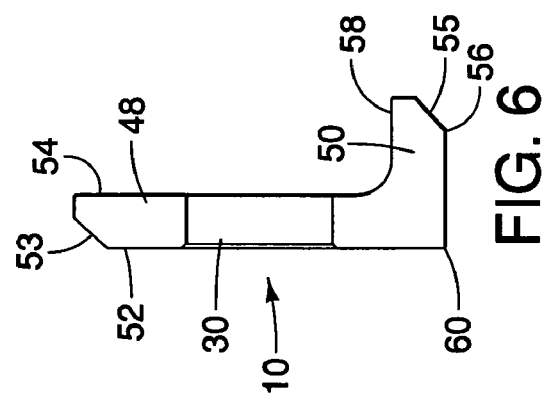
FIG. 5
FIG. 6

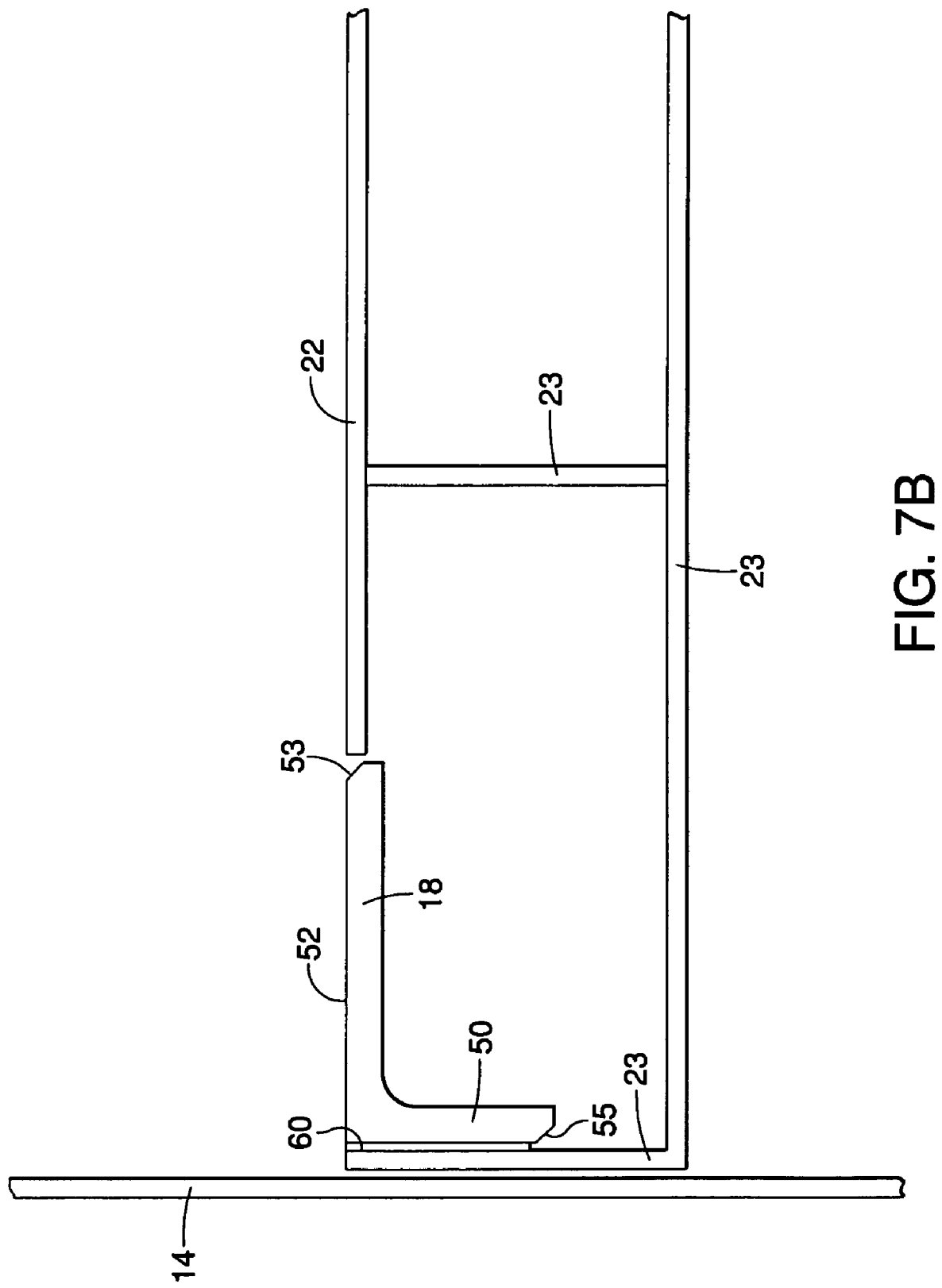

TIE-DOWN ANCHOR FOR FREIGHT

RELATED APPLICATIONS

The present patent document claims the benefit of the filing date under 35 U.S.C. §119(e) of Provisional U.S. Patent Application Ser. No. 60/610,917, filed Sep. 17, 2004, which is hereby incorporated by reference herein.

TECHNICAL FIELD

This invention relates to securing freight during transport, and more particularly, to a tie-down system for securing freight to a vehicle.

BACKGROUND OF THE INVENTION

Transportation of goods, either by land, air, or water, generally requires that the goods be secured within the transport vehicle in order to prevent the goods from shifting en route. Large, bulky freight items in particular are often secured during shipment. One manner of securing these items is by using straps that extend over a portion of the freight such that each end of the strap is then secured to the transport vehicle. These straps are made of a durable material having a high tensile strength, such as nylon, so as to prevent breakage of the strap due to the loads applied to the strap by the freight during shipment.

FIG. 2 illustrates a typical strap 28 configuration used to tie down and secure freight 26 during shipment. The straps are adjustable, and have at least one connector mechanism at each of the distal ends of the strap. Each strap is extended across an item of freight, and each distal end of the strap is secured to the structure of the vehicle. In particular, a tie-down anchor is attached to the structure of a vehicle, and the tie-down anchor is adapted to receive a connector mechanism attached to the distal ends of the strap. Thus, the tie-down anchor attached to the structure of a vehicle has historically been adapted to receive only one type of strap from a particular manufacturer.

The receiving mechanisms, or tie-down anchors, have historically been attached to the floor of the transport vehicle on which the freight is placed during transport. The tie-down anchors can also be attached to the side walls of the vehicle, particularly if the freight being transport is particularly tall or if the freight is stacked and there is a need to secure the upper articles of freight as well as those on the bottom. These tie-down anchors are usually installed on the vehicle after the manufacture of the vehicle is completed, as an after-market add-on by the owner or lessee of the vehicle.

The tie-down anchors are used in the railroad industry and with other types of transport vehicles in a similar manner. The prior art tie-down anchors used in railcars are generally installed using holes cut in the floor of the railcar. The tie-down anchors are spaced at regular intervals along each longitudinal side of the railcar in the holes cut in the floor. The prior art tie-down anchors consist of tubular sections that are inserted through the holes cut in the floor and welded to the underframe structure of the freight car. A top plate is then welded to the tubular section such that the top plate is substantially coplanar with the floor of the railcar. The top plate includes apertures formed therethrough, and the apertures correspond to the connecting mechanism of a particular manufacturer's retaining strap. As noted above, a disadvantage of this system is that the prior art tie-down anchors are custom design for, and can only be used with, the retaining strap for which they are designed. Another disadvantage of these prior art tie-down anchors is the amount of significant welding required to install them securely. Furthermore, because the floor of the railcar is cut in order to receive individual prior art tie-down anchors, and then the top plate of the tie-down anchor is then welded to the floor, it is difficult to maintain a smooth surface on the floor.

BRIEF SUMMARY

The present invention provides for a tie-down anchor, a system of securing freight within a transport vehicle, and a method for securing freight to a transport vehicle.

In one aspect of the present invention, a floor tie-down anchor is provided for securing freight during transport. The tie-down anchor is an L-shaped bracket having a pair of legs that form an angle relative to each other, and one of the legs has at least one aperture formed therethrough.

In another aspect of the present invention, a system is provided for securing freight within a transport vehicle. The system includes a first tie-down anchor and a second tie-down anchor attached to a structural member of a transport vehicle, and each of the tie-down anchors has at least one aperture formed thererthrough. The system further including a retaining strap having a connecting mechanism attached to each end of the strap, and the apertures of the tie-down anchors are adapted to receive the connecting mechanisms of the strap.

In yet another aspect of the present invention, a method is provided for securing freight to a transport vehicle. The method of securing freight to a transport vehicle includes attaching a first and second tie-down anchor to a structural member of the vehicle, and each of the tie-down anchors has at least two apertures of different shapes formed therethrough. The method also includes positioning a strap across a portion of the freight and securing the opposing ends of the strap to the tie-down anchors, and further includes adjusting the strap to secure the freight to the transport vehicle.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 3 is a top plan view of a restraining strap;

FIG. 4A is a side view of one embodiment of a B-hook connecting mechanism;

FIG. 4B is a top view of the B-hook connecting mechanism of FIG. 4A;

FIG. 4C is a side view of a hook connecting mechanism;

FIG. 5 is a top view of one embodiment of a tie-down anchor;

FIG. 6 is a side cross-sectional view of the tie-down anchor of FIG. 5;

FIG. 7B is a transverse section of a railcar showing a second embodiment of the orientation of the structural members.

DETAILED DESCRIPTION OF THE DRAWINGS AND THE PRESENTLY PREFERRED EMBODIMENTS

Figure 1:
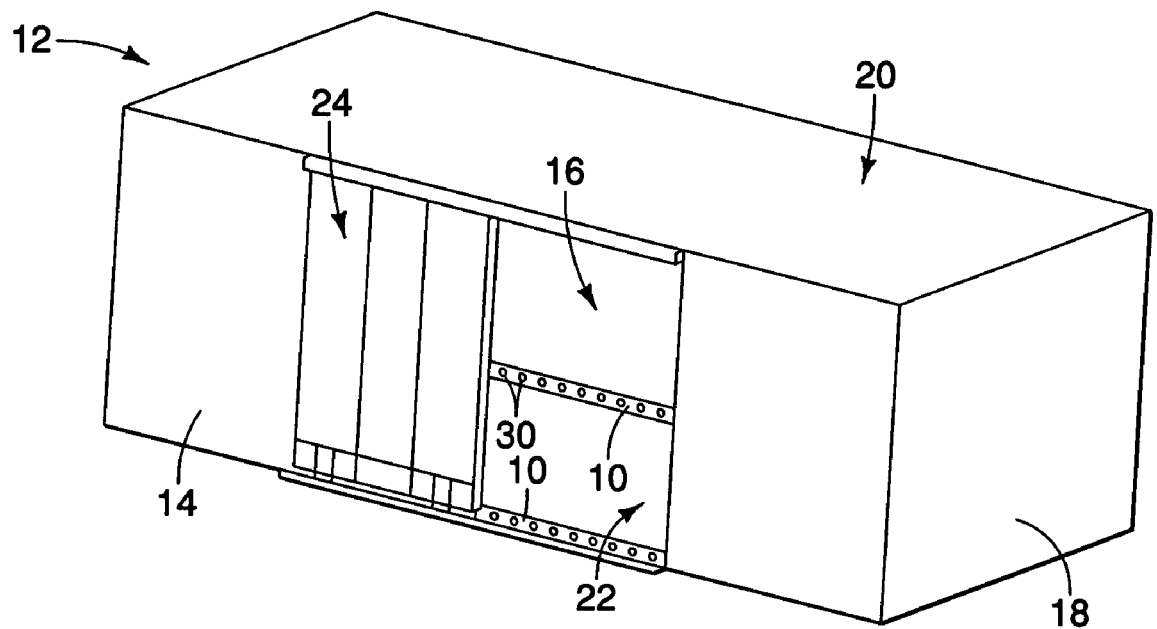
FIG. 1 is a top perspective view of a railcar.

Referring to FIG. 1, one embodiment of the present invention is shown, whereby a tie-down anchor 10 is disposed along both longitudinal edges of the floor of a railcar 12. The following description and corresponding figures describe and illustrate the tie-down anchor of the present invention in association with a railcar, but it should be understood by one skilled in the art that the tie-down anchor can be used in association with any other transport vehicle sufficient to withstand the structural loading transferred by the tie-down anchor to the vehicle. Furthermore, the following description describes and illustrates the tie-down anchor of the present invention being attached to the floor of a transport vehicle, but it should be understood by one skilled in the art that the tie-down anchor can be attached to any structural member of a transport vehicle, including, but not limited to, a side wall, an end wall, the ceiling, or any other structural member (including a frame) of a transport vehicle capable of distributing the restraint forces from a restraining strap through the vehicle.

The railcar 12 of FIG. 1 has a first side wall 14, a second side wall 16, a pair of end walls 18, a roof 20, and a floor 22. The first side wall 14 has a door 24 to allow freight to be loaded and unloaded from the railcar 12. As illustrated in FIG. 1, the tie-down anchor 10 is disposed along each of the longitudinal edges of the floor 22 such that the tie-down anchor 10 is flush with the floor 22 surface. The tie-down anchors 10 are preferably located adjacent to the side walls 14, 16. It should be understood by one skilled in the art that the tie-down anchor can be located at various locations within a vehicle including, but not limited to, adjacent the side walls, adjacent the end walls, along the floor and spaced apart from the side walls and the end walls, or at any location on the side walls or end walls. The tie-down anchor is preferably fixedly attached to a side wall 14, 16, the floor 22, and the underframe structure 23 configured to support the floor 22. An advantage of attaching the tie-down anchor 10 to the underframe structure 23 of the railcar 12 is that the tie-down anchor may provide structural reinforcement to the railcar body.

Figure 2:
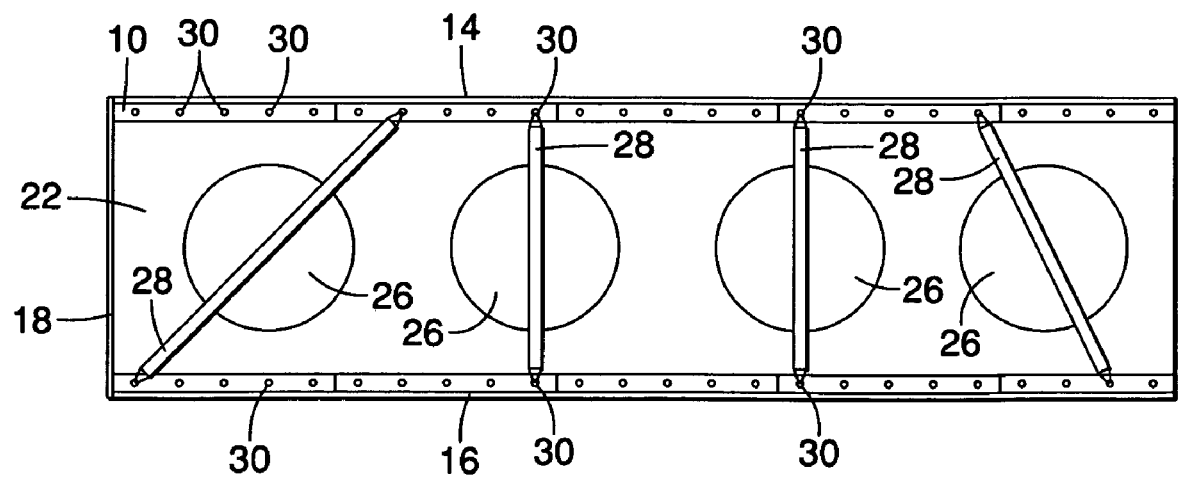
FIG. 2 is a top cross-sectional view of the railcar of FIG. 1.

As freight 26 is positioned in the railcar 12, the freight 26 is typically secured relative to the railcar 12 by a system of straps 28, as illustrated in FIG. 2. The straps 28 are adjustable such that the user can tighten the tension in the straps 28 in order to secure the freight 26 to the railcar 12. The straps 28 secure the freight 26 to the railcar 12 by having opposing ends of each strap 28 disposed within one of a plurality of apertures 30 defined through the tie-down anchor 10. In an alternative embodiment, one end of a strap 28 is fixedly attached to a side wall 14, 16 of the railcar 12, and the opposing end being attached to a tie-down anchor 10 to secure the freight 26.

FIG. 3 illustrates one embodiment of a strap 28 adapted to secure freight 26 to a railcar 12 during transport. The strap 28 has an elongated web 32, wherein each end of the web 32 forms a loop 34. Each loop 34 is adapted to receive a D-ring 36, and each D-ring 36 is further connected to a pair of links 38 that provide strength and durability to the strap 28. A connecting mechanism is a structural element that is operatively attached to a strap 28, and is located at a distal end of the strap 28 in order to securing the ends of the strap 28 to the a tie-down anchor 10 once the strap 28 has been positioned to secure an item of freight 26. One embodiment of a connecting mechanism is illustrated as a B-hook 40 in FIGS. 4A and 4B, wherein the B-hook 40 has a stem 42 and a pair of lobes 44 extending laterally from the stem 42. The B-hook 40 is attached to the D-ring 36 via the links 38. In an alternative embodiment, the connecting mechanism is shaped as a hook 45 having an elongated portion being curved at one end, as illustrated in FIG. 4C. It should be understood by one skilled in the art that any other type of connecting mechanism sufficient to be received by a tie-down anchor as well as transfer the restraining loads from the freight to the tie-down anchor can be used. A conventional toggle mechanism 46 is disposed along the length of the web 32. The toggle mechanism 46 allows a user to adjust the length and tension of the strap 28 when securing the freight 26. The strap 28 can be made of a flexible, yet durable, material that allows the strap 28 to be elastically deformable so as to secure the freight to the railcar such that a toggle mechanism is not needed.

FIGS. 5-6 show one embodiment of a tie-down anchor 10. In the preferred embodiment, the tie-down anchor 10 is an elongated bracket being L-shaped. The L-shaped tie-down anchor 10 includes a first leg 48 and a second leg 50 forming a substantially right-angle therebetween. One of the legs 48, 50 preferably has a plurality of apertures 30, or openings, defined therethrough. The apertures 10 are defined in the leg 48, 50 of the tie-down anchor 10. In an alternative embodiment, the tie-down anchor 10 includes only a single aperture 30 defined therethrough. However, it should be understood by one skilled in the art that each tie-down anchor can have any number of apertures defined therethrough.

When a tie-down anchor includes a plurality of apertures 30, at least two of the apertures are formed of different shapes, as illustrated in FIG. 5. Because the connecting mechanism attached received by a tie-down anchor and attached to the end of a strap 28 varies by manufacturers, multiple apertures 30 having different shapes allows for various types of connecting mechanisms to be received by a tie-down anchor 10. The tie-down anchor 10 illustrated in FIGS. 5-6 is configured to receive at least two different types of connecting mechanisms such that the oval-shaped slot 30 receives one type of connecting mechanism and the circular hole 30 receives a different type of connecting mechanism.

The size and shape of the apertures 30 can vary in order to receive different types of connecting mechanisms. In one embodiment, the obround slot 30, illustrated in FIG. 5, is configured to receive the stem 42 and lobes 44 of the B-hook 40, illustrated in FIGS. 4A-4B. To secure the strap 28 to the tie-down anchor 10, one of the lobes 44 is first inserted through the slot 30, a portion of the stem 42 is then inserted through the slot 30 until the B-hook 40 can be rotated such that the second lobe 44 passes through the slot 30. Once both lobes 44 have passed through the slot 30, the B-hook 40 is pulled in a retracting manner until the lobes 44 contact the second, or bottom, surface 54 of the tie-down anchor 10, thereby securing the distal end of the strap 28 to the tie-down anchor 10.

In an alternative embodiment, the aperture 30 of the tie-down anchor comprising a circular hole, illustrated in FIG. 5, is configured to receive the hook 45, illustrated in FIG. 4C. To secure the end of the strap 28 to the tie-down anchor, the tip of the hook 45 is inserted through the circular hole 30 as the elongated portion of the hook 45 is rotated until the tip of the hook 45 abuts the second, or bottom, surface 54 of the tie-down anchor.

The apertures 30 comprising circular holes preferably have a diameter of about one and three-quarter inch (1.75"). The apertures being round or oval-shaped slots preferably have a length of about one and three-quarter inch (1.75"). The size of the aperture 30 is preferably large enough to allow a corresponding connector mechanism to be inserted therethrough yet small enough to prevent the connector mechanism to be disengaged from the aperture 30 due to shifting of the freight 26 during transport.

The apertures 30 can be formed in any shape sufficient to receive the stem 42 and lobes 44 of a B-hook 40, or adapted receive any other form of an attaching mechanism connected to a strap 28 so as to securely attach an end of a strap 28 to a tie-down anchor 10. FIG. 5 illustrates a first embodiment of an aperture 30 comprising an obround or oval-shaped slot and a second embodiment of an aperture 30 comprising a circular hole. It should be understood by one skilled in the art that although the apertures 30 are illustrated as oval slots and circular holes, the apertures can be of any shape adapted to receive at least one type of connecting mechanism. The apertures 30 defined in a tie-down anchor 10 form a pattern in which the shape, quantity, distance between adjacent apertures 30, and size of each aperture 30 are exemplary variables that define the pattern. Preferably, each tie-down anchor 10 has the same pattern of apertures 30 such that the apertures 30 are adapted to receive a variety of different connecting mechanisms so as to maximize the number of connecting mechanisms that can be used in conjunction with each tie-down anchor.

The first leg 48 of the tie-down anchor 10 has a first surface 52 and a second surface 54, wherein the first surface 52 is directed upward toward the area of the railcar in which the freight is located and the second surface 54 is directed downward in the opposite direction, as illustrated in FIGS. 6-7B. The second lea 50 provides a third surface 56 and a fourth surface 58 of the tie-down anchor 10, wherein the third surface 56 is directed toward the longitudinal axis of the railcar 12 and the fourth surface 58 is directed outward toward a side wall 14, 18 adjacent to the tie-down anchor 10. The legs 48, 50 of the tie-down anchor 10 can be of any transverse thickness so as to provide one leg having sufficient transverse thickness through which apertures 30 can be defined and another leg having sufficient transverse thickness such that the leg can provide an attachment surface to secure the tie-down anchor 10 to structure of the railcar 12.

Figure 8:
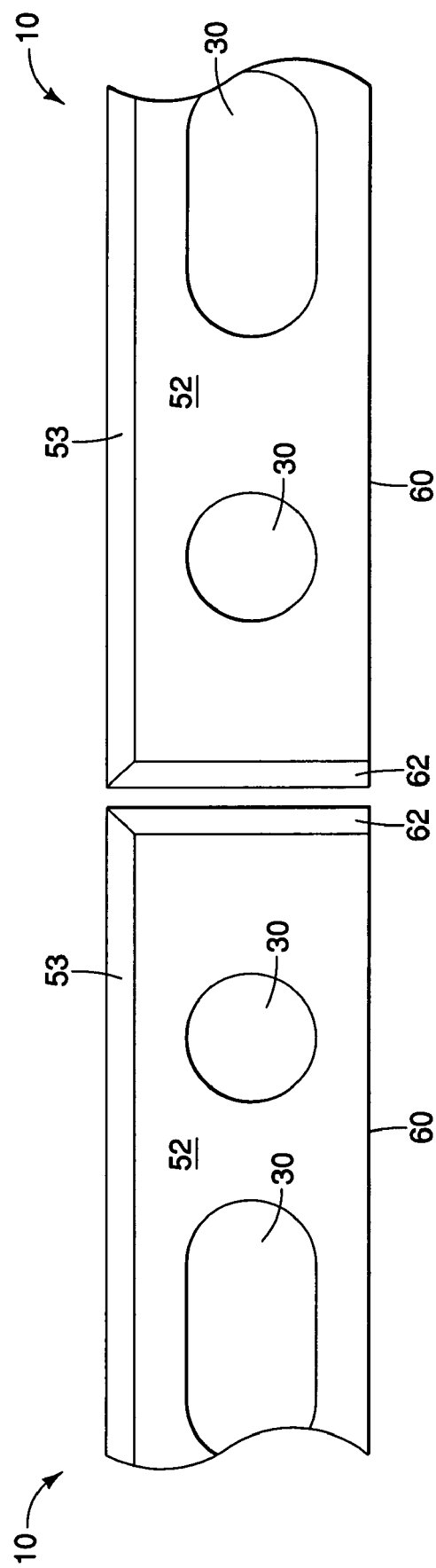
FIG. 8 is a top view of two tie-down anchors welded in series.

The first surface 52 of the first leg 48 opposite the proximal edge 60 preferably defines a first chamfered edge 53, as illustrated in FIGS. 5-6. The third surface 56 of the second leg 50 opposite the proximal edge 60 likewise preferably forms a second chamfered edge 55. The transverse edges 62 on the first surface 52 are also chamfered, as illustrated in FIG. 5. The transverse edges (not shown) of the third surface 56 are preferably chamfered in a manner similar to the transverse edges 62 of the first surface 52. The chamfered, transverse edges 62 on both the first surface 52 and third surface 56 provide a surface to which a weld can be made between a pair of tie-down anchors 10, thereby creating a section or track of tie-down anchors 10 joined together in series, as illustrated in FIG. 8. In an alternative embodiment, the tie-down anchor 10 has no chamfered surfaces. It should be understood by one skilled in the art that the chamfered edges provide a surface to which a weld is applied so that the tie-down anchor can be welded to an adjacent member, but any other type of connection sufficient to secure the tie-down anchor to the floor or a support structure of a vehicle can be used including, but not limited to, rivets.

Figure 7A:
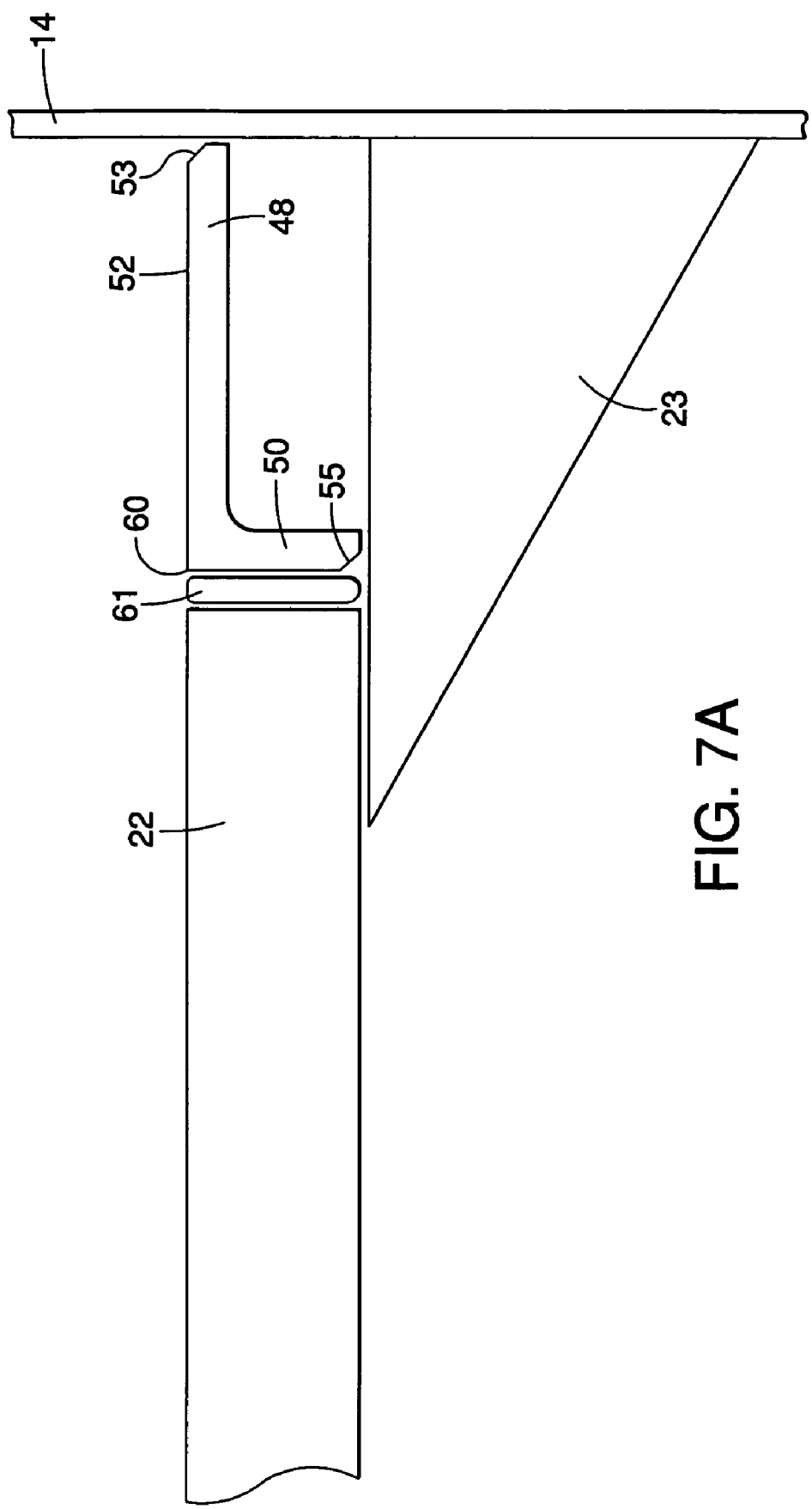
FIG. 7A is a transverse section of a railcar showing a first embodiment of the orientation of the structural members.

The elongated L-shaped tie-down anchor 10 is preferably disposed along the longitudinal edges of the floor 22 of a railcar 12 such that the first surface 52 of the first leg 48 is generally coplanar with the floor 22 and the second leg 50 is directed downward, as illustrated in FIG. 7A. Preferably, the proximal edge 60 of the tie-down anchor is adjacent to the floor 22, the first chamfered edge 53 is adjacent to a side wall 14, 16, and the second chamfered edge 55 is adjacent to both the underframe structure 23 and the floor 22. A spacer 61 is disposed between the second leg 50 and the floor 22. One embodiment of the underframe structure 23, as shown in FIG. 7A, is a triangular-shaped angle-bracket having one edge attached to a side wall 14, 16, and an adjacent edge extending toward the longitudinal centerline of the railcar 12 to provide structural support to the floor 22. In an alternative embodiment, illustrated in FIG. 7B, the first chamfered edge 53 is adjacent to, and connected to the floor 22 of the railcar 12 and the second leg 50 is directed downward and connected to a side wall 14, 16. It should be understood by one skilled in the art that the tie-down anchor can be located along the transverse edges of the floor 22, immediately adjacent to the end walls 18 such that the longitudinal axis of the tie-down anchor 10 is oriented in a transverse manner relative to the longitudinal axis of the railcar 12. It should also be understood by one skilled in the art that the tie-down anchor can be disposed on the floor 22 at an angle relative to the longitudinal or transverse direction of the railcar 12.

The overall length of a single tie-down anchor is preferably between about one (1) and ten (10) feet in the longitudinal direction, and more preferably, five (5) feet in length. However, it should be understood by one skilled in the art that the length of a single tie-down anchor can be of sufficient length to span the entire length of the vehicle or of sufficient length to encompass a single aperture, or any length therebetween. In the preferred embodiment, as illustrated in FIG. 8, a plurality of tie-down anchors 10 are attached together in series, wherein the transverse edges 62 of the first and third surfaces 52, 56 of one tie-down anchor 10 are connected to the corresponding transverse edges 62 of the first and third surfaces 52, 56 of the adjacent tie-down anchor such that the connected tie-down anchors form a single elongated track of tie-down anchors.

In the preferred embodiment, a track of tie-down anchors 10 is disposed along the entire length of the floor as well as being located immediately adjacent to the edges of the floor 22, as illustrated in FIG. 2. An advantage to having a tie-down anchor 10 having a plurality of different types of apertures 30 defined therethrough as well as the tie-down anchor 10 being installed in the floor 22 in a continuous manner along the entire length of the edges of the floor 22 is that the straps 28 can be extended across the width of the vehicle at any angle, and particularly an angle to secure the freight in the most advantageous manner. In an alternative embodiment, the tie-down anchors 10 can be spaced apart along the length of the railcar 12, thereby not providing a continuous track of tie-down anchors 10 along the entire edge of the floor 22.

The tie-down anchor 10 is preferably applied to a railcar during the manufacture or assembly of the railcar as opposed to an after-market add-on. However, it should be understood by one skilled in the art that the tie-down anchor 10 is configured so that it can be added to the railcar either during the manufacture or assembly of the railcar or after production of the railcar is completed. The tie-down anchor 10 can be added to an assembly process, such as when the floor 22 is attached to the underframe structure 23. One advantage of attaching the tie-down anchor 10 during the railcar assembly process is that machines can be programmed to provide a consistent, even weld along the entire length of the tie-down anchor, thereby requiring less post-production finishing to grind the weld so as to maintain a smooth and uniform surface between the floor and the tie-down anchor.

One method of installing a tie-down anchor 10 during the assembly of a railcar 12 includes attaching a plurality of underframe structures 23 along the length of both opposing side walls 14, 16 in a spaced-apart manner. One tie-down anchor 10 is located atop the underframe structures along the length of the first side wall 14 such that the distal end of the second leg 50 abuts the underframe structures 23 and the first leg 48 abuts the first side wall 14. The first chamfered edge 53 is welded to the first side wall 14 and the second chamfered edge 55 is welded to the underframe structures 23. A tie-down anchor 10 is attached to the second side wall 16 and corresponding underframe structures 23 in the same manner. The floor 22 is then located between the tie-down anchors 10. There is generally a small gap between the floor and the tie-down anchors, and the gap is filled by a filler plate. The floor 22 is then welded to the underframe structure 23 to generate a continuous floor for the railcar 12.

The tie-down anchor 10 is preferably formed by rolling hot steel through angled dyes, wherein the apertures 30 are punched through the first leg 48 after the hot rolling process. In an alternative embodiment, the tie-down anchor 10 is formed from casting aluminum, steel, or other castable metal. In a further alternative embodiment, the tie-down anchor 10 is formed from a flat bar of steel that is stamped to form an angle, after which the apertures 30 are punched therethrough. In yet another alternative embodiment, the tie-down anchor 10 is formed by joining two pieces of flat steel along a common longitudinal edge to form an angle therebetween wherein one of the pieces of steel have apertures 30 defined therethrough. It should be understood by one skilled in the art that the tie-down anchors can be formed of any material or by any process to provide a tie-down anchor having sufficient strength and durability to withstand the loads generated by the retaining straps.

A tie-down anchor 10 can be attached to a railcar 12 after the railcar has been fully assembled. Because the floor 22 of a railcar 12 typically extends to, and abuts, the side walls 14, 16, a hole is cut in the floor 22 of the railcar. The size of the hole to be cut in the floor is generally the same size as the first leg 48 of the tie-down anchor 10 in order to provide a minimal gap between the tie-down anchor and the floor. The tie-down anchor 10 is inserted into the hole cut in the floor 22 of the railcar in a manner in which the first surface 52 of the first leg 48 is substantially coplanar with the top surface of the floor 22. The tie-down anchor 10 is then welded along the longitudinal length of the tie-down anchor such that any gap between the first chamfered edge 53 and the side wall 14, 16 is closed, and similar welds are added between the second chamfered edge 55, the floor 22, and the underframe structure 23. Once the tie-down anchor 10 has been attached to the railcar, a grinding tool is used to smooth the welds between the side wall 14, 16 and the tie-down anchor 10 so as to generate a continuous surface.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A tie-down anchor comprising:
an elongated L-shaped bracket operatively connected to a railcar, said L-shaped bracket including a first leg and a second leg, wherein said first leg and said second leg form an angle therebetween;
said first leg having a first surface and a second surface and said second leg having a third surface and a fourth surface, wherein said first surface is immediately adjacent to said third surface of said second leg, thereby forming a proximal edge common to both of said first surface and said third surface, wherein a first chamfered edge is located on said first surface opposite said proximal edge; and
at least one aperture defined through said first leg, wherein said at least one aperture is configured to receive a connecting mechanism for securing freight.

2. The tie-down anchor of claim 1, wherein said angle formed between said first leg and said second leg is about ninety degrees (90°).

3. The tie-down anchor of claim 1, wherein a second chamfered edge is located on said third surface opposite said proximal edge.

4. The tie-down anchor of claim 1, wherein said at least one aperture defined through said first leg includes is an oval slot.

5. The tie-down anchor of claim 1, wherein said bracket further comprises hot-rolled steel.

6. The tie-down anchor of claim 1, wherein said bracket is formed by a casting.

7. The tie-down anchor of claim 1, wherein said bracket is formed by stamping.

8. The tie-down anchor of claim 1, wherein said anchor is attached to a floor of a transport vehicle.

9. The system for securing freight of claim 8, wherein said anchor extends along an entire side of said floor.

10. The system for securing freight of claim 8, wherein said anchor is attached to said floor to provide a substantially coplanar surface between said anchor and said floor.

11. The tie-down anchor of claim 1 wherein at least one aperture is a circular hole.

12. The tie-down anchor of claim 11, wherein at least one aperture is an oval slot.

* * * * *